United States Patent [19]
Gold et al.

[11] Patent Number: 6,145,428
[45] Date of Patent: Nov. 14, 2000

[54] INTEGRATED FIRE AND FLIGHT CONTROL SYSTEM FOR CONTROLLING THE ANGLE OF ATTACK OF A ROTARY WING AIRCRAFT

[75] Inventors: Phillip J. Gold, Shelton, Conn.; Donald L. Fogler, Jr., Kent, Wash.

[73] Assignee: Sikorsky Aircraft Corporation, Stratford, Conn.

[21] Appl. No.: 09/052,463

[22] Filed: Mar. 31, 1998

[51] Int. Cl.[7] .................................................... F41G 3/22
[52] U.S. Cl. ...................................... 89/41.21; 244/17.13
[58] Field of Search ........................ 89/41.21; 244/17.13, 244/182

[56] References Cited

U.S. PATENT DOCUMENTS

| 5,195,700 | 3/1993 | Fogler, Jr. et al. | 244/17.13 |
|---|---|---|---|
| 5,222,691 | 6/1993 | Gold et al. | 244/17.13 |
| 5,238,203 | 8/1993 | Skonieczy et al. | 244/17.13 |
| 5,263,662 | 11/1993 | Fowler et al. | 244/17.13 |
| 5,310,135 | 5/1994 | Fowler et al. | 244/17.13 |
| 5,310,136 | 5/1994 | Fowler et al. | 244/17.13 |
| 5,331,881 | 7/1994 | Fowler et al. | 89/41.21 |
| 5,428,543 | 6/1995 | Gold et al. | 364/433 |
| 5,465,212 | 11/1995 | Fowler et al. | 364/427 |

OTHER PUBLICATIONS

System Development Report, May 1996 (pp. 35–27 only).
Preliminary Design Review, May 1996 (slide PDR–11 only).
System Development Report, Mar. 24, 1997 (see pp. 35–37) pp. 1–71.
Development Review Briefing Notes, Mar. 24, 1997 (see Slides IFFC DR 61–63) DR1–DR80.

*Primary Examiner*—Stephen M. Johnson
*Attorney, Agent, or Firm*—Moore & Van Allen PLLC; Dominic J. Chiantera

[57] ABSTRACT

An integrated fire and flight control system of the type which controls aircraft flight dynamics to referenced values defined by a weapon launch solution to provide optimum aircraft to target orientation, further optimizes the aircraft's angle of attack (AOA) to the target by controlling the aircraft's vertical speed to modify the aircraft's rate of climb or descent as necessary to produce an actual pitch attitude that is within a range of AOA values corresponding to the range of permissive weapon launch vertical speeds recommended by the weapons manufacturer.

11 Claims, 5 Drawing Sheets

FIG. 4

INTEGRATED FIRE AND FLIGHT CONTROL SYSTEM FOR CONTROLLING THE ANGLE OF ATTACK OF A ROTARY WING AIRCRAFT

This invention was made with Government funded support under Contract No. DAAJ02-95-C-0034 awarded by the Department of the Army. The Government has certain rights in this invention.

DESCRIPTION

1. Technical Field

This invention relates to flight control systems for rotary wing aircraft, and more particularly to an integrated fire and flight control system of the type in which the fire control portion supplements the authority of the flight control portion during pilot selectable intervals.

2. Background Art

Integrated fire control and flight control systems are known for use in weapon equipped rotary wing aircraft to coordinate the aircraft's flight attitude with that required for accurate launching or firing of the aircraft's weapons. These integrated systems embody both an automated flight control function, which controls the aircraft's response in its yaw, pitch, roll and collective axis to the sensed state of the aircraft's flight dynamics, to provide stable aircraft responsiveness to pilot commanded maneuvers, as well as a fire control function which modifies the flight control authority under certain circumstances to provide optimum aircraft-to-target orientation for weapon launch. One such integrated fire and flight control (IFFC) system is disclosed and claimed in commonly owned U.S Pat. No. 5,331,881 entitled Helicopter Integrated Fire and Flight Control Having Azimuth and Pitch Control, issued Jul. 26, 1994 to Fowler et al.

The '881 referenced IFFC system provides an override of the flight control authority in the yaw and pitch axes by replacing the yaw attitude feedback error signal and the pitch attitude feedback error signal with an azimuth command signal and an elevation command signal provided by fire control circuitry. The purpose is to desensitize the fight control system to small pilot commanded stick inputs which may otherwise affect the desired azimuth and elevation required for accurate target sighting while the aircraft is in a weapons launch mode.

While the '881 reference discloses an IFFC system with two axis fire control, commonly owned U.S. Pat. No. 5,263,662 entitled: Helicopter Integrated Fire and Flight Control System Having Turn Coordination Control issued Nov. 23, 1993 to Fowler et al, and U.S. Pat. No. 5,465,212 entitled: Helicopter Integrated Fire and Flight Control Having a Pre-launch and Post-lazinch Maneuver Director, issued Nov. 7, 1995 to Fowler et al., each discloses TFFC systems with three axis (yaw, pitch and roll) fire control. The three axis system of the '662 reference provides yaw and pitch axis override by replacing the yaw and pitch rate error signals with the rate of change in the azimuth and elevation commands provided by the fire control system, and provides a bank angle signal to place the aircraft in a roll angle. The system's objective is to provide a substantially coordinated turn and optimum stabilization during aircraft maneuvers in the weapon launch period. Similarly the '212 reference discloses a three axis IFFC which provides the forward acceleration and velocity profile necessary to satisfy optimum aircraft to target weapon launch.

Each of the referenced IFFC systems incorporates a fire control system logic which is functionally integrated with the aircraft's flight control system so as to provide seamless transition between flight control and fire control authority when commanded by the pilot. Each of these systems further includes a bi-functional flight control comprising a primary flight control system (PFCS) with primary authority in enacting pilot commanded inputs to the aircraft, and an automatic flight control system (AFCS) which supplements PFCS performance with additional trim functions to optimize the aircraft's dynamic response to the commanded inputs. The PFCS and AFCS arc functionally coordinated and their performance is characterized by a model following transfer function of the type disclosed in commonly owned U.S. Pat. No. 5,238,203 entitled: High Speed Turn Coordination for Rotary Wing Aircraft, issued Aug. 24, 1993 to Skonicczny et al.

While the prior art IFFC systems each address the primary aircraft flight control dynamics which affect weapon aiming accuracy, there are secondary considerations. One such consideration which is important to safe and accurate launch of weapons is the angle of attack (AOA) of the aircraft. Defined as the difference between pitch, i.e. the spatial orientation of the centerline of the aircraft, and the air-referenced flight path angle, i.e. the airspeed vector in the vertical plane, the AOA substantially contributes to the initial conditions of the weapon's launch state to the extent that if the AOA magnitude is too great the initial conditions required for safe weapon launch may be exceeded.

As known, the fire control launch solution for the aircraft's on-board weapons prescribes the pitch attitude required for weapon launch. Therefore, if the AOA is to be controlled it must be done by changing the aircraft's vertical speed. This requires fire control authority in the lift, or collective axis, which is not known in the prior art IFFC systems.

DISCLOSURE OF INVENTION

One object of the present invention is to provide an integrated fire and flight control (IFFC) system which limits the angle of attack (AOA) of a rotary wing aircraft to minimum values that are consistent with the launch vertical speed envelope prescribed by the weapon manufacturer for accurate launch of weapons in a weapons launch mode. Another object of the present invention is to provide an IFFC system which is capable of coordinating fire control authority of AOA with other existing fire control authorities in a non-interference manner.

According to the present invention, an IFFC of the type which controls aircraft flight dynamics to referenced values defined by a weapon launch solution to provide optimum aircraft to target orientation, further optimizes the aircraft's angle of attack (AOA) to the target by controlling the aircraft's vertical speed. In further accord with the present invention the IFFC system incorporates fire control logic in the aircraft's collective axis to modify the aircraft's rate of climb or descent as necessary to produce an actual pitch attitude that is within a range of AOA values corresponding to the range of permissive weapon launch vertical speeds recommended by the weapons manufacturer. In still further accord with the present invention the constraints on vertical speed provided by the present IFFC are enabled in response to enablement of an altitude hold state by the pilot. In yet still further accord with the present invention the vertical speed constraints supplant the authority of the flight control with respect to vertical speed, and can override the pilot commanded vertical speed.

The present IFFC system control laws for AOA are integrated with the advanced flight control laws of the aircraft and generate body axis angular rate (or vertical rate) commands that drive command models in the AFCS and feedforward commands that sum with the AFCS output commands. When the weapon launch mode is selected by the pilot, the aircraft is first orientated to bring the aircraft's weapon within the "target window", i.e. the aircraft is positioned within the azimuth and elevation constraints commanded by the firing solution, then the AOA constraints are satisfied while the other IFFC control laws continue to maneuver the aircraft to point directly at the target's position, as defined by the launch solution.

The AOA limiting algorithm commands a rate of climb/descent that is a function of commanded pitch angle, and it is specific to the selected weapon's launch constraints. The permissive weapon launch vertical speed envelope is defined for each of the on-board weapons. If the constraint is small the climb angle is commanded to be equal to the pitch attitude, thus driving the AOA to zero. This function is only phased in when the aircraft is positioned near the target azimuth solution so it will not interfere with the attack maneuver. At low speeds this function is disabled to prevent unnecessary collective activity.

These constraint laws use pre-defined aircraft maneuver capabilities. The weapon and sensor constraint aiding functions couple the aircraft to the weapon or sensor directed line of sight (LOS) as in the basic coupled aiming except that there is an appropriate deadzone of operation around the LOS. Within the deadzone, normal aircraft control remains in effect. When the deadzone is exceeded the IFFC control laws provide coupling commands to maintain the aircraft at the edge of the constraint boundary. In each case, the control axis coupling articulates the constraint boundary applicable to that weapons system and the constraint is in effect only while approaching the constraint envelope limit. The constraint aiding laws are authority limited so that the pilot can override them if necessary.

The collective axis authority of the fire control portion of the present IFFC system is interfaced with the model following Altitude Hold mode of the flight control portion. The collective axis interface is similar to the implementation in the other IFFC axes and comprises a vertical rate command and a proportional feedforward command. The fire control collective authority is enacted when the Altitude Hold mode is engaged by the pilot, and is otherwise inactive. The pilot can override the function by moving the displacement collective stick on the left side of the cockpit. The pilot can move the collective against trim while leaving the collective AFCS engaged, or the pilot can disable stick trim and the vertical AFCS by pressing the collective trim release switch (the trigger switch under the collective stick grip).

These and other objects, features, and advantages of the present invention will become more apparent in light of the following detailed description of a best mode embodiment thereof, as illustrated in the accompanying Drawing.

BRIEF DESCRIPTION OF THE DRAWINGS

FIG. 2 including

BEST MODE FOR CARRYING OUT THE INVENTION

Figure 1:
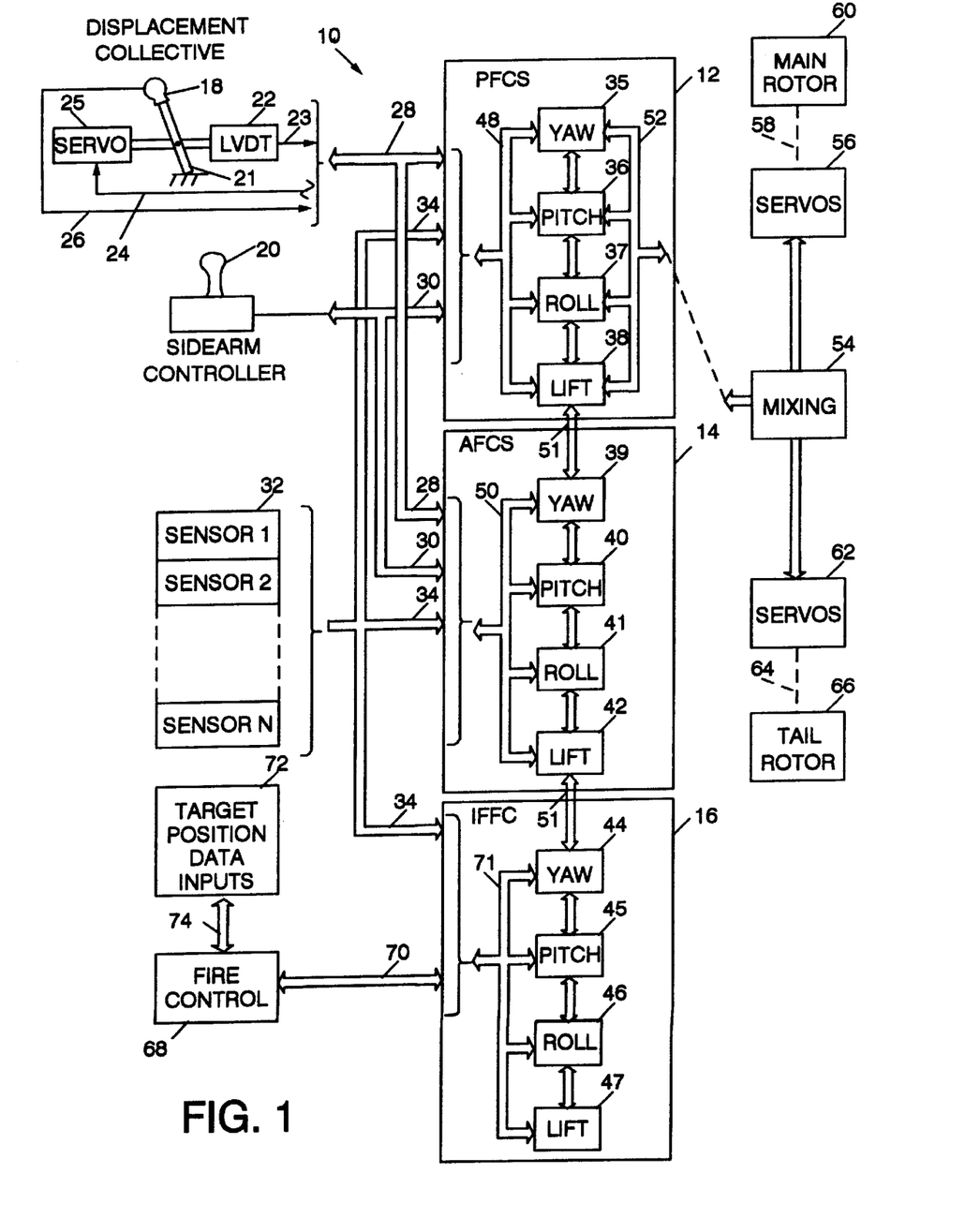
FIG. 1 is a system block diagram of an IFFC system according to the present invention.

Referring to FIG. 1, the integrated fire and flight control (IFFC) system 10 of the present invention includes a primary flight control system (PFCS) 12, an automatic flight control system (AFCS) 14, and an IFFC 16. The PFCS 12 and AFCS 14 each receive displacement command signals from the pilot operated displacement collective stick 18 and force command signals from a four axis side arm controller 20. The displacement stick is typically located to the left of the pilot's seat and pivots about a point 21. The position of the displacement stick is sensed by a linear variable differential transformer (LVDT) 22 which provides an electrical signal indicative of stick position on a line 23 to the PFCS and AFCS. To give the pilot tactile feel of the collective load the PFCS provides a drive signal on a line 24 to a servo 25, which in turn drives the displacement collective stick 18 so that it tracks the command signal on line 24.

The displacement collective stick also includes several pilot switched discrete signals, including altitude hold mode, IFFC engaged mode, and weapon launch mode signals, which are provided through line 26 and, together with the signals on lines 23 and 24, are presented through trunk lines 28 to the PFCS and AFCS, which also receive the output force signals from the sidearm controller on trunk lines 30. The PFCS, AFCS, and IFFC 16 each receive sensed signals from aircraft sensors 32 on lines 34. The sensed signals are representative of the instantaneous actual value of selected aircraft parameters including: vertical acceleration, vertical rate, radar altitude, barometric altitude, angular rate, attitude, and velocity.

It should be understood that the reference herein to the term trunk lines is a figurative term for the collective signal pathways between the various elements of the system 10. As known to those skilled in the art, while the individual signal paths may be conductive wires which are bundled in trunks for purposes of utility and/or protection (the trunk lines may be shielded against both mechanical and electro-magnetic interference), the trunks may equally well be digital signal busses, such as MIL-STD-1553, ARINC 429, 629, or RS422. As described in U.S. Pat. No. 5,263,662 cited hereinbefore, the PFCS and AFCS each have separate yaw, pitch, roll and lift control logic for providing four axis control of the aircraft. The logic is included in PFCS control modules 35–38 and AFCS control modules 39–42, respectively. In the present system 10, however, the IFFC 16, while including yaw, pitch and roll control modules 44–46 similar to those modules described in the '662 reference, it further includes lift control module 47 to permit the IFFC to also provide vertical axis control as well as yaw, pitch and roll axis flight control of the aircraft during target acquisition in the presence of the pilot initiated coupled aiming flight mode. Within the PFCS the control modules 35–38 receive the pilot command signals from the displacement collective stick 18 and sidearm controller 20 on lines 28, 30, as well as the sensed parameter signals on lines 34, through trunk lines 48. Similarly, these signals are distributed within the AFCS on lines 50 to control modules 39–42.

As shown and described in detail in the hereinbefore cited references to U.S. Pat. No. 5,238,203 to Skonieczny et al; U.S. Pat. No. 5,263,662 to Fowler et al; U.S. Pat. No. 5,310,135 to Fowler et al; and U.S. Pat. No. 5,331,881 to Fowler et al, each of which are hereby incorporated by reference herein, the PCFS and AFCS each use a model following algorithm in each of the four control axes to shape the pilot's side arm controller and displacement stick commands to produce the desired aircraft response. The control modules of both systems, which are connected together through lines 51, collectively provide rotor command signals on PFCS output lines 52 to the aircraft's rotor mixing function 54. In response, the mixing function 54 positions the aircraft's controlled surfaces by commanding the displacement of mechanical servos 56 and linkages 58 to control the tip path plane of main rotor 60, as well as commanding displacement of tail rotor servos 62 and linkages 64 to control the thrust of the aircraft's tail rotor 66.

The IFFC receives, in addition to the sensed aircraft parameter signals on the lines 34, fire control command signals from a fire control system 68 on lines 70. These signals are presented through trunk lines 71 to the IFFC control modules 44–47. The fire control system 60 provides the azimuth and elevation fire control command signals in response to target position data presented to it from target position/angle data inputs 72 on lines 74. The target position/angle data may be provided from a number of alternate, well known sources, such as line-of-sight angle sensors, map and position data, infrared sensors, laser sensors, and radar sensors.

The IFFC control modules 44–47 are also connected through lines 51 to the four axis control modules in the PFCS and AFCS. As described hereinbefore each of the different axis control modules incorporate a model following algorithm. In the yaw, pitch and roll axes the model following algorithm is incorporated in the PFCS, which has primary authority in these three axes. In the collective axis, however, the mechanical stick has primary authority so the model following algorithm is located within the AFCS, as shown in FIG. 2.

Figure 2:
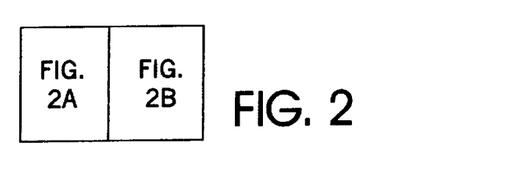
Figure 2A:
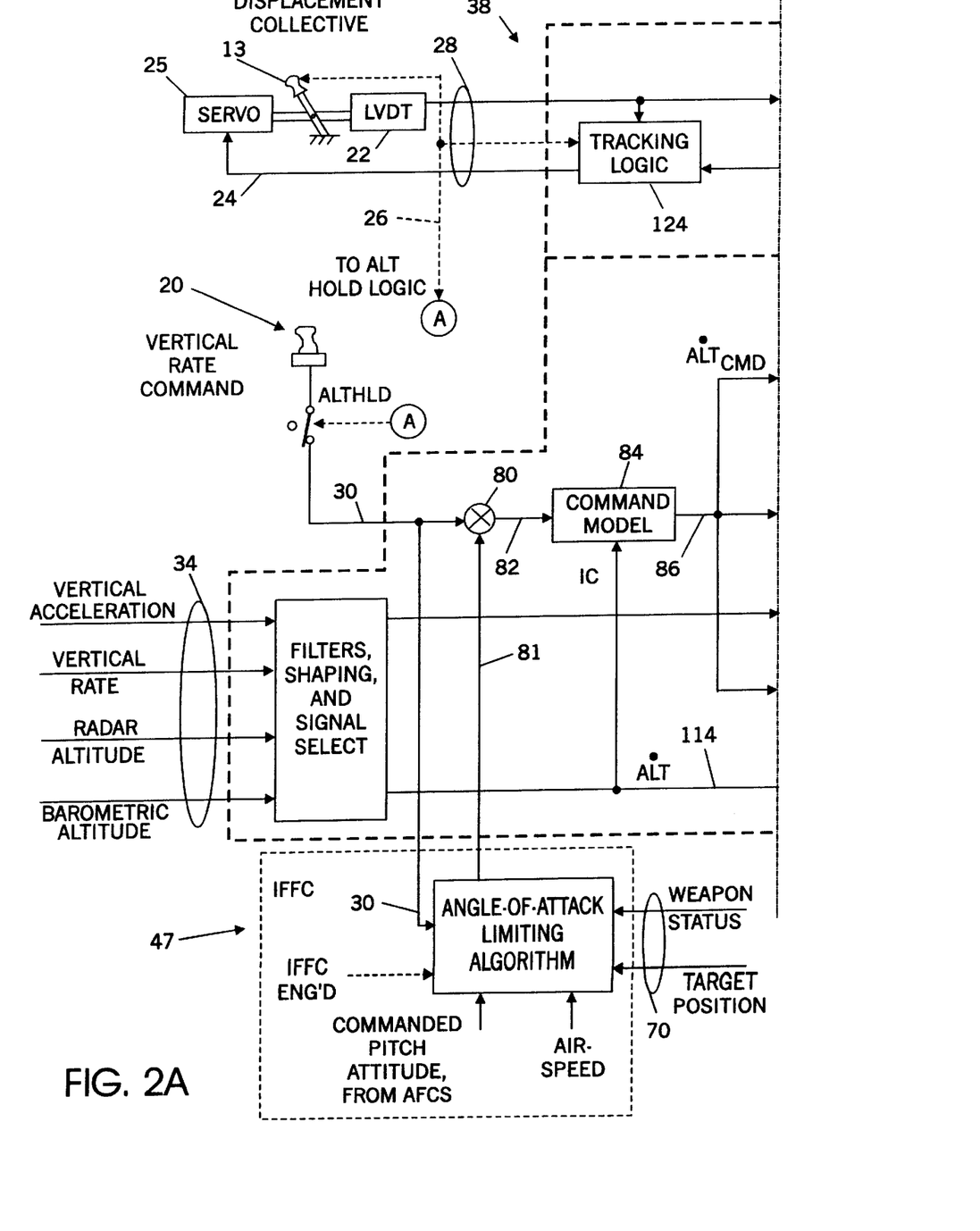
FIGS. 2A and 2B is a top level functional block diagram of the control logic of the system of FIG. 1.
Figure 2B:
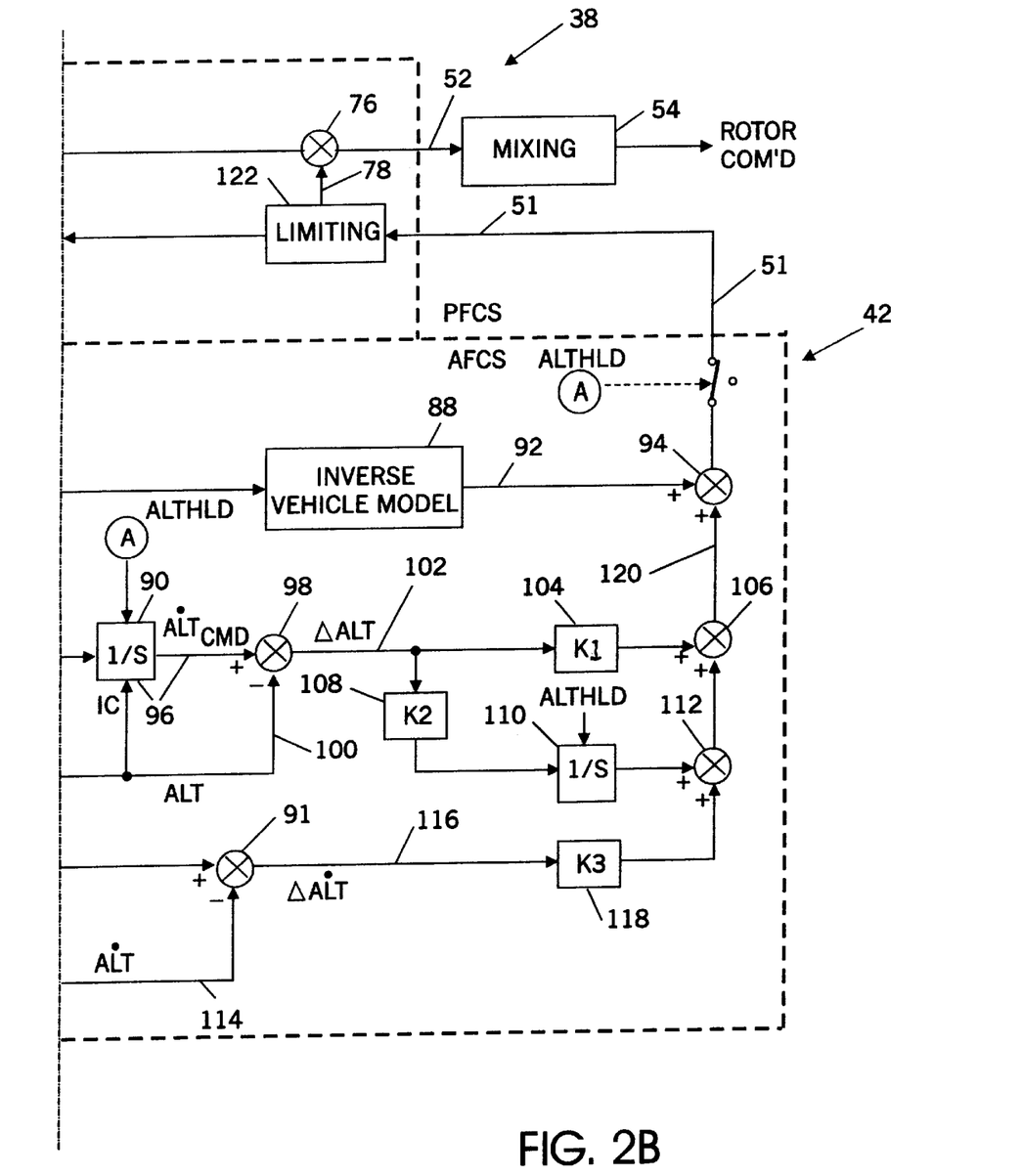

Referring now to FIG. 2, which illustrates the functional interconnection of the lift axis control modules 38, 42 and 47 of the PFCS, AFCS, and IFFC respectively. In the best mode embodiment of the IFFC system it has been deemed preferable to have the PFCS and AFCS functional roles altered for the collective axis control modules. The PFCS in the collective axis control is essentially a full mechanical control in consideration of the pilot having a displacement collective stick, and the AFCS embodies the electronic content of the flight control, including the model following algorithm. The PFCS control module 38 (FIG. 1) receives the pilot command signal entered through the displacement collective stick 18 on line 28 where it is presented directly to PFCS summing junction 76. The pilot commanded collective is there summed with a modifying collective command signal presented on line 78 to the summing junction from the AFCS, which is described in detail hereinafter. The summed resultant signal becomes the actual collective command signal which is presented through output lines 52 to the mixing function 54.

The AFCS lift control module 42 receives the vertical command signals from the pilot through the sidearm controller 20 on lines 30, and the sensed aircraft parameter signals (from sensors 32, FIG. 1) on lines 34. The AFCS also receives the pilot discrete signal inputs on the lines 26, which include an "Alt Hold" discrete input signal (i.e. altitude hold mode signal—labeled A in FIG. 2) which enables (when Alt Hold is selected) or disables (when Alt Hold is not selected) the AFCS modifying collective command signal from reaching the summing junction 76; the result being that when Alt Hold is not selected the AFCS and, therefore, the AOA constraint algorithms from the IFFC control module 47 do not modify the plot commanded collective signal, which is presented directly to the rotor mixing function (45, FIG. 1).

In normal operation the pilot may enter vertical rate command information to the AFCS by pulling up or pushing down on the sidearm controller to command a climb or descent. These command signals are presented within the AFCS to a summing junction 80, which also receives the modifying vertical rate command signal on a line 81 from the IFFC vertical axis module. The modifying vertical rate command signal will be described in detail hereinafter with respect to FIG. 3. The summed result from the junction 80 is presented on line 82 as the unfiltered altitude rate command d(ALT)/dt to a command model 84, which is a first order lag filter that provides the filtered command on lines 86 to the inverse vehicle model transform 88, to an integrator 90, and to summing junction 91. The inverse model 88 is typically a Z-model transform which may be embodied as a first order lead filter, as described more fully in the hereinbefore referenced U.S. Pat. No. 5,238,203, and which provides a proportional signal representation of a modified commanded vertical displacement signal on line 92 to AFCS output summing junction 94.

The integrator 90 integrates the vertical rate of change signal on lines 86 to provide an altitude command on lines 96 to summing junction 98, where the integral is summed with the aircraft's sensed actual altitude on line 100 to provide the summed result as an altitude error signal on line 102. This error signal is multiplied by a proportional gain factor K1 104, and the proportional resultant signal is presented to summing junction 106. The error signal is also multiplied by gain K2 108 and integrated through integrator 110 to provide an integral altitude signal to summing junction 112. Finally, the summing junction 91 sums the altitude rate of change signal on line 86 with the aircraft's sensed actual vertical rate on line 114 to provide an altitude rate of change error signal on line 116. This rate error signal is multiplied by gain K3 118 and presented to sum junction 112.

The net summed signal from junction 106 and 112 is a proportional plus integral plus derivative feedback signal which is presented on lines 120 to junction 94. The summed result of junction 94 is presented through lines 51 to the PFCS module 38 as the modifying collective command signal, which is presented on the line 78 to the summing junction 76 via the limiting circuitry 122. The limiting circuitry splits the modifying collective signal into low frequency and high frequency components. The low frequency component is rate limited and presented through tracking logic 124 which then backdrives the displacement collective stick through servo 25 to provide the pilot with the necessary tactile feel of the full collective load. The high frequency component is amplitude limited and passes without limit to the line 78 input of the junction 76, the summed output of which is the modified collective command signal presented to the rotor mixing function 54.

Figure 3:
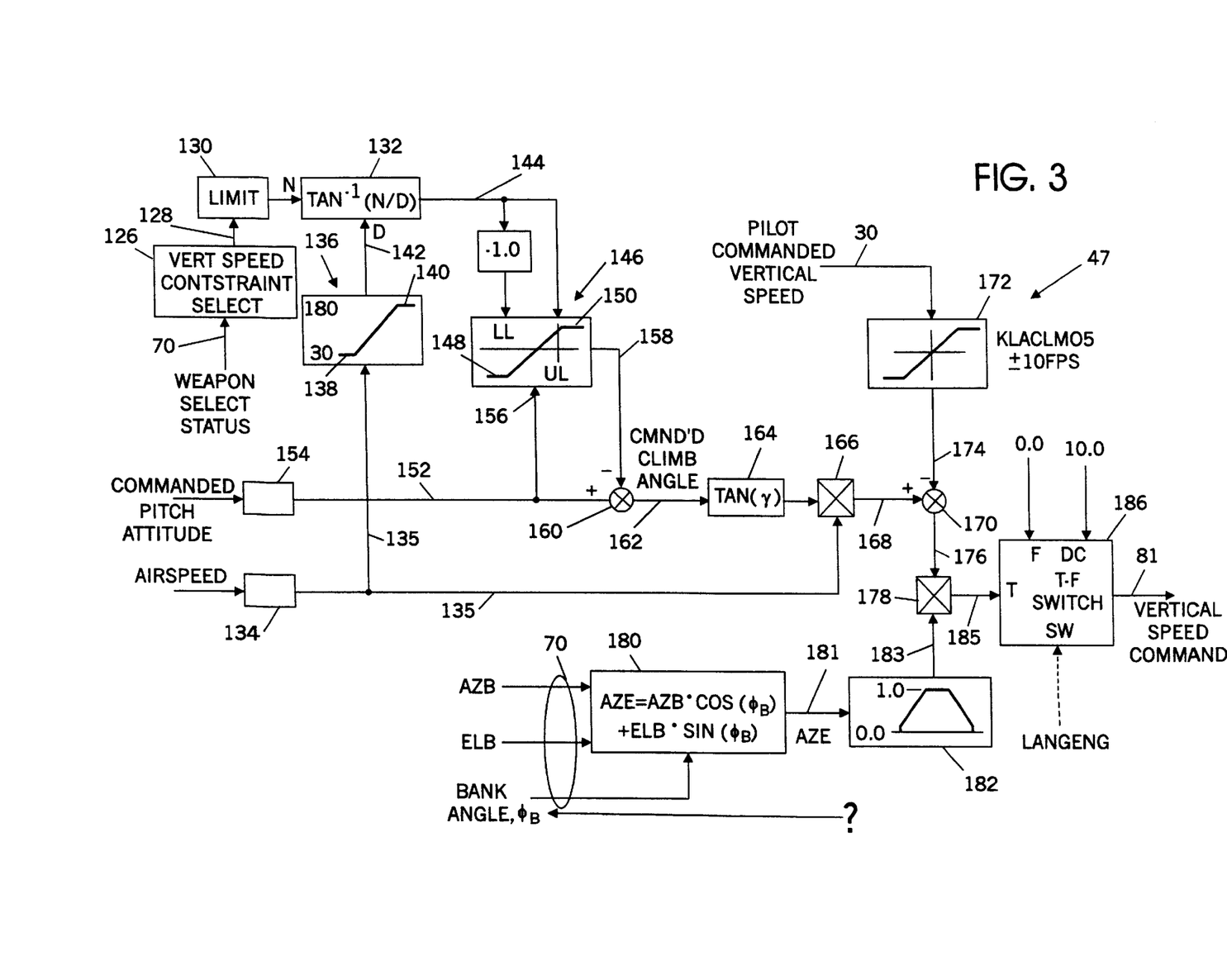
FIG. 3 is a functional block diagram of a portion of the control logic of FIG. 2.

Referring now to FIG. 3, the IFFC control module 47 receives a weapons select status signal on lines 70 from the fire control 68 (FIG. 1) identifying an onboard weapon system selected by the pilot. The weapon identifying information is presented to a vertical speed constraint database 126, typically a look-up table which correlates the manufacturer's specified vertical speed value by weapon system identification. The output of the look-up table is presented on lines 128 as a signal representative of the manufacturer's specified vertical speed constraint value for the selected weapon. The specification signal is presented to limiter circuitry 130 which reduces the specified value of the vertical speed to provide an added "safe margin" tolerance. The limiter gain is selectable, and may be established on a case by case basis. In the best mode embodiment the limiter gain is set at 0.8 v/v to provide a 20% attenuation factor.

The AOA threshold limit (+/−φ for assent/descent) is calculated as the arc tangent value $\phi=\text{Tan}^{-1} N/D$ in module 132, where the numerator N is the "as limited" specified vertical speed and the denominator D is the aircraft's sensed actual airspeed. The actual airspeed signal is presented through lines 34 (FIG. 1) to the IFFC and is converted from knots-per-hour to feet-per-second in converter 134. The converted quantity is presented through lines 135 to limiter 136 which provides unity gain (1.0 v/v) to the sensed airspeed values between lower 138 and upper 140 airspeed limits established for the aircraft. The output airspeed signal from the limiter is then presented through lines 142 to the module 132.

The calculated AOA value φ represents the maximum (+/−)desired (assent/descent) angle of attack magnitude, and it is presented through lines 144 to limiter 146 . The limiter establishes a unity gain transfer (1.0 v/v) between the lower limit −φ 148 and the upper limit +φ 150 to the commanded pitch attitude signal on line 152. The commanded pitch altitude comes from the AFCS and equals the integral of commanded pitch rate signal. The commanded pitch attitude signal is presented through converter 154 which provides a scale factor of π to convert the signal from pi-radians to radians and is presented on lines 152 to the signal input 156 of the limiter 146. For commanded pitch attitude values between +/−φ the commanded pitch attitude is passed through the limiter onto output lines 158 to summing junction 160. Values of commanded pitch attitude outside of the lower or upper limits is blocked by the limiter resulting in a zero output on line 158 to the junction 160. The result is that the summed output of the junction 160 on lines 162 (referred to as the commanded climb angle) is zero for values of commanded pitch attitude between +/−φ, i.e. within the +/− AOA range, or "deadzone", and is equal to the actual commanded pitch attitude for all values outside of the AOA range.

Module 164 determines the tangent of the commanded pitch attitude angular value and the tangent value is multiplied in multiplier 166 with the actual airspeed signal on lines 135 to provide on lines 168 the desired aircraft vertical speed in feet-per-second. The desired vertical speed is presented to summing junction 170, which also receives the pilot commanded vertical speed on lines 30, which is presented through limiter circuitry 172. The limit values for the limiter 172 are typically ±10 ft./sec. (i.e. the limiter passes pilot commands up to ±10 ft) and the limiter output signal is presented on lines 174 to the junction 170. The junction sums the AOA commanded vertical speed with the negative value of the pilot commanded vertical speed (with the effect of allowing the AOA to cancel up to +/−10 ft/sec of pilot commanded vertical speed) and provides the sum difference on lines 176 to multiplier 178.

The other input to multiplier 178 is a gain factor which is a function of earth referenced target direction. It is derived from the aircraft's bank angle and the body axis azimuth and elevation to the target. The purpose of this gain function is to phase in the AOA algorithm only when the aircraft is pointing near the target. In this way the algorithm will not interfere with the aircraft maneuvering state when weapon launch is not imminent.

This is accomplished in module 180, which calculates the earth-referenced target direction angle (the angle between the aircraft heading and the target). Module 180 receives body-referenced azimuth and elevation target direction angles (AZB and ELB) and aircraft bank angle (φB) on lines 70 from the fire control 68 and from the AFCS respectively. The target direction angle AZB is multiplied by the cosine of the bank angle (φB) and target direction angle ELB is multiplied by the sine of the bank angle (φB), and the two products are summed to provide AZE, the earth-referenced target directions angle. AZE is passed to the look-up table in module 182 via line 181. The module 182 provides a variable value multiplicand which is used to multiply the AOA vertical commanded signal on lines 176. If the value of AZE is between +/− 5° the multiplier is unity (1.0). The multiplier value decreases substantially linearly to 0.0 when the absolute value of AZE is greater plus or minus 15°|AZE|>+/− 150°). The multiplicand output of 182 is presented through line 183 to multiplier 178, where it is multiplied with the vertical command signal, and the resulting product is presented on line 185 to the TRUE input of switch 186. The switch 186 is responsive to AOA engage logic (LANGENG) which is a function of Altitude Hold engaged, IFFC engaged, and airspeed greater than 30 knots. When LANGENG goes from "FALSE" to "TRUE," the output of block 186 switches in a smooth, transient-free manner from the FALSE state input, nominally 0.0, to the TRUE state input. The maximum rate of change of the output signal is defined by the DC input and is typically 10 feet/second/second. The output of switch 186 is presented on line 187 as the modified vertical rate command signal on line 81 to summing junction 80 (FIG. 2).

Figure 4:
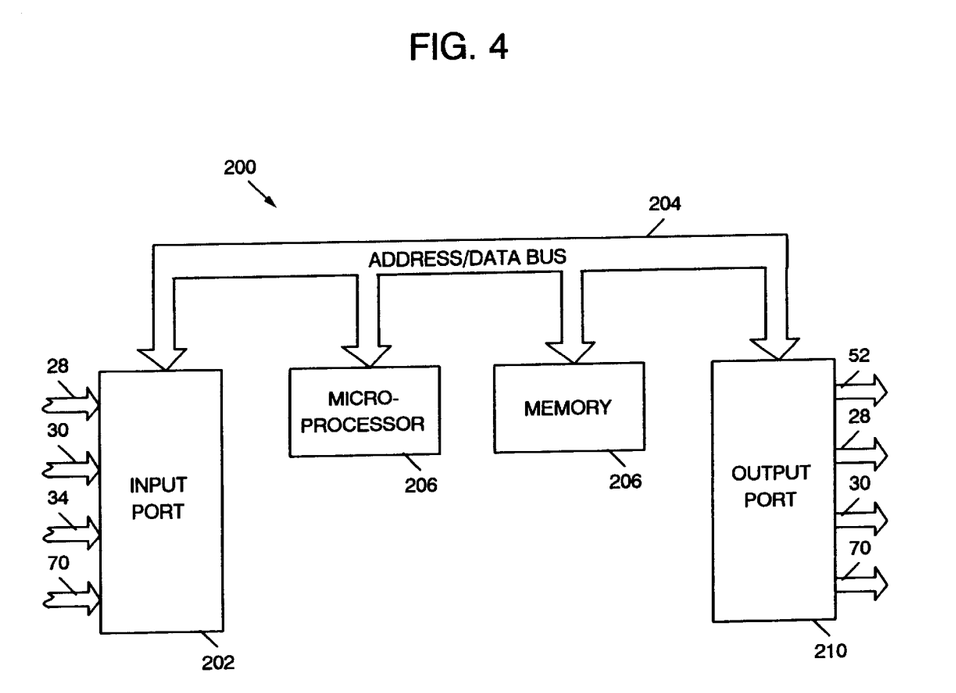
FIG. 4 is system block diagram of one embodiment capable of performing the control logic sequence illustrated by the elements of FIGS. 2 and 3.

The description heretofore of the present IFFC system functions has been disclosed in terms of functional block diagrams using frequency domain notation. It is understood by those skilled in the art the these functions as disclosed may be enacted in either dedicated hardware circuitry, or preferably in programmed software routines capable of execution in a microprocessor based electronics control embodiment. Referring to FIG. 4, in an exemplary embodiment of a preferred embodiment of a microprocessor based control 200 suitable for implementing each of the IFFC system control modules functions, the input signal lines 28, 30, 34 and 70 from the displacement collective stick 18, the side arm controller 20, the sensors 32 and the fire control 68 are received at an input port 202 which may include analog-to-digital converters (not shown), frequency-to-digital converter (not shown), and such other signal conditioning functions, as may be deemed necessary by those skilled in the art to convert the actual IFFC signal format to digital signal format.

The input port is connected through buss 204 to a central processing unit (CPU) 206, to memory 208, and to an output port 210. As known, the buss provides signal transfer between the elements of the microprocessor control. The CPU may be any type of known microprocessor having performance characteristics such as may be deemed suitable by those skilled in the art for performing the invention in the manner described. Similarly the memory is a known functional type, such as RAM, UVPROM, or EEPROM, as may be deemed suitable for the application by those skilled in the art. The outport port 210 provides: the PFCS output signals to the rotor mixing function on lines 52, the return signal from the PFCS to the Displacement collective stick on lines 28, the return signals from the AFCS to the sidearm controller on lines 30, and the exchanged communications between the IFFC and the fire control over lines 70. The output port may comprise digital to analog converters (not shown), parallel to serial converter (not shown) and a discrete output driver (not shown).

The IFFC of the present invention provides four axis (pitch, roll, yaw and collective, or lift) control. The IFFC control laws are integrated with the advanced flight control laws of the baseline rotorcraft. These control laws are implemented in the pitch, roll, yaw, and collective control axes. In general the IFFC control laws generate body axis angular rate (or vertical rate) commands that drive command models in the AFCS and feedforward commands that sum with the AFCS output commands.

The weapon and sensor constraint aiding functions couple the aircraft to the weapon or sensor directed line of sight (LOS) as in the basic coupled aiming except that there is an appropriate deadzone of operation around the LOS. Within the deadzone, normal aircraft control remains in effect. When the deadzone is exceeded the IFFC control laws provide coupling commands to maintain the aircraft at the edge of the constraint boundary. The constraint aiding laws are authority limited so that the pilot can override them if necessary. The control laws for pilot command canceling are now phase sensitive so that the pilot is free to fly back into the deadzone.

Generic IFFC control laws are provided for each weapon and sensor type, including turreted weapons and fixed weapons. These constraint laws use pre-defined aircraft maneuver capabilities. In each case, the coupling articulates the constraint boundary applicable to that system and is in effect only while approaching the constraint envelope limit. Depending weapon which weapon is active, the IFFC function selects the appropriate limit signals for maintaining the aircraft within constraints.

The collective axis of the IFFC control laws supports launch of both guided and unguided weapons by providing AOA constraint limiting and engine torque limiting. It is interfaced with the model following Altitude Hold mode of the baseline AFCS. If Altitude Hold is not engaged this mode is inactive. The torque limiting function reduces collective when the required engine torque exceeds available torque. The pilot can override these functions by moving the displacement collective stick on the left side of the cockpit. The pilot can move the collective against trim while leaving the collective AFCS engaged, or the pilot can disable stick trim and the vertical AFCS by pressing the collective trim release switch (the trigger switch under the collective stick grip).

Although the invention has been shown and described with respect to a best mode embodiment thereof, it should be understood by those skilled in the art that various changes, omissions, and additions may be made to the form and detail of the disclosed embodiment without departing from the spirit and scope of the invention, as recited in the following claims.

We claim:

1. Integrated fire and flight control (IFFC) apparatus for controlling the response of a weapons equipped rotary wing aircraft to commanded maneuvers from pilot operable controls, including a displacement collective stick and a sidearm controller, each for commanding a change in the rotary wing controlled surfaces, and one or more pilot operable switches for providing selectable actuation of IFFC operating modes, including an altitude hold mode and a weapons launch mode, the aircraft having sensors for providing sensed signals indicative of the actual values of the aircraft's operating parameters, and further having a source of weapon solution command signals indicative of operating parameter values deemed desirable to optimize aircraft operation in the weapons launch mode, the apparatus comprising;

flight control means, responsive to the pilot operable controls, to the sensed signals, and to fire control signals presented thereto, and including signal processing means having memory means for storing signals representative of one or more flight control algorithms which prescribe desired present values of selected aircraft operating parameters in response to present values of the sensed signals and of said fire control signal, said flight control means providing flight control signals for modifying pilot commanded changes to the rotary wing controlled surfaces in response to said desired present values of said flight control algorithms; and fire control means, responsive to the pilot operable controls, the sensed signals, and to the weapon solution command signals, for providing, in the presence of the weapons launch mode, said fire control signals to said flight control means to alter said desired present values and said flight control signals in dependence on the weapon solution command signals;

as characterized by:

the sensed signals including the actual values of the aircraft's vertical speed, vertical acceleration, altitude, and airspeed;

the weapon solution command signals including weapon identification signals for identifying a pilot selected weapon system;

said flight control signals including a collective axis command signal for modifying pilot commanded changes in the aircraft's collective axis in response to a pilot commanded vertical speed signal; and said fire control means including a reference source of angle of attack (AOA) limit signals for providing for each weapon system identified by said weapon identification system, an associated maximum desired AOA value to be maintained by the aircraft during operation of the identified weapon, said fire control means, in response to said AOA limit signals in the presence of said weapon launch mode, presenting said fire control signals to said flight control means such as to modify said pilot commanded vertical speed value in dependence on said AOA limit signal.

2. The apparatus of claim 1, wherein said fight control means comprises:

primary flight control system (PFCS) means, responsive to the pilot operable controls and to said flight control signals, for modifying pilot commanded changes to the rotary wing controlled surfaces in dependence on said collective axis command signal; and automatic flight control system (AFCS) means, including said flight control algorithms for providing said collective axis command signal to said PFCS means, said flight control algorithms embodying a model following transfer function for providing said desired present values in response to the sensed signals.

3. The apparatus of claim 2, wherein said model following transfer function incorporates a Z transform.

4. The apparatus of claim 2 wherein:

sad AFCS means, in the presence of said altitude hold mode, provides said collective axis command signal in dependence on the difference signal magnitude between said pilot commanded vertical speed signal and a fire control signal indicative of desired vertical speed; and wherein said fire control means is further responsive to a pilot commanded pitch attitude signal, for modifying said commanded pitch attitude signal in dependence on said AOA limit signals to provide a modified pitch command angular value, said fire control means, in the presence of the altitude hold mode, providing said fire control signals indicative of desired vertical speed to said AFCS means as the product of said modified pitch command angular value and the aircraft's actual airspeed.

5. The apparatus of claim 4, wherein said fire control means modifies said pilot commanded pitch attitude signal by limiting the signal magnitude thereof to substantially zero for absolute values of commanded pitch attitude signal magnitude which are no greater than the AOA signal magnitude.

6. The apparatus of claim 4, wherein said fire control means provides said desired vertical speed signal to said AFCS means in the presence of an earth azimuth value which is within a range of earth azimuth values identified by the weapon solution command signals.

7. The apparatus of claim 2, wherein each of said AOA limit signals have an angular value substantially equal to the arc tangent of the maximum vertical speed specified for the identified weapon system by the weapon system manufacturer divided by the aircraft's sensed actual airspeed.

8. The apparatus of claim 1 wherein:

said AFCS means, in the presence of said altitude hold mode, provides said collective axis command signal in dependence on the difference signal magnitude between said pilot commanded vertical speed signal and a fire control signal indicative of desired vertical speed; and wherein said fire control means is further responsive to a pilot commanded pitch attitude signal, for modifying said commanded pitch attitude signal in dependence on said AOA limit signals to provide a modified pitch command angular value, said fire control means, in the presence of the altitude hold mode, providing said fire control signals indicative of desired vertical speed to said AFCS means as the product of said modified pitch command angular value and the aircraft's actual airspeed.

9. The apparatus of claim 8, wherein said fire control means modifies said pilot commanded pitch attitude signal by limiting the signal magnitude thereof to substantially zero for absolute values of commanded pitch attitude signal magnitude which are no greater than the AOA signal magnitude.

10. The apparatus of claim 8, wherein said fire control means provides said desired vertical speed signal to said AFCS means in the presence of an earth azimuth value which is within a range of earth azimuth values identified by the weapon solution command signals.

11. The apparatus of claim 1, wherein each of said AOA limit signals have an angular value substantially equal to the arc tangent of the maximum vertical speed specified for the identified weapon system by the weapon system manufacturer divided by the aircraft's sensed actual airspeed.

* * * * *

UNITED STATES PATENT AND TRADEMARK OFFICE
CERTIFICATE OF CORRECTION

PATENT NO. : 6,145,428
DATED : November 14, 2000
INVENTOR(S) : Phillip J. Gold and Donald L. Fogler, Jr.

It is certified that error appears in the above-identified patent and that said Letters Patent is hereby corrected as shown below:

Column 1,
Line 52, change "Post-lazinch", to -- Post-launch --.
Line 53, change "TFFC", to -- IFFC --.

Column 2,
Line 15, change "Skonicczny", to -- Skonieczny --.

Column 4,
Line 23, change "arc", to -- are --.

Column 8,
Line 9, change "15°|AZE|>+/-150°)", to -- 15° (|AZE|>+/-15°) --.

Column 9,
Line 16, change "arc", to -- are --.
Line 22, after "Depending", delete "weapon", and insert -- upon --.

Column 10,
Line 54, change "2", to -- 1 --.
Line 55, change "sad", to -- said --

Column 11,
Line 20, change "1", to -- 2 --.

Signed and Sealed this

Second Day of October, 2001

Attest:

NICHOLAS P. GODICI
Attesting Officer   Acting Director of the United States Patent and Trademark Office